United States Patent

Olson

[15] 3,693,440
[45] Sept. 26, 1972

[54] ELECTROMAGNETIC FLOWMETER
[72] Inventor: Jack R. Olson, San Diego, Calif.
[73] Assignee: The United States of America as represented by the Secretary of the Navy
[22] Filed: March 21, 1969
[21] Appl. No.: 809,361

[52] U.S. Cl. .............................73/194 EM, 73/170 A
[51] Int. Cl. .............................G01f 1/00, G01p 5/08
[58] Field of Search ......73/194 EM, 189, 181, 170 O

[56] References Cited

UNITED STATES PATENTS 3,119,259  1/1964  Ten Bosch et al. ...........73/181
3,161,047  12/1964  Griswold .....................73/189
3,308,659  3/1967  Herndon.......................73/194
3,347,224  10/1967  Adams..................73/194 UX Primary Examiner—Charles A. Ruehl
Attorney—J. C. Warfield, Jr. and George J. Rubens

[57] ABSTRACT

An electromagnetic flowmeter which has an "open" cage construction of magnet coils and electrodes arranged to achieve an angular response which closely approximates a true cosine, resulting from unrestricted fluid flow through the magnetic field.

6 Claims, 7 Drawing Figures

PATENTED SEP 26 1972

INVENTOR.
JACK R. OLSON
BY
George J. Rubens
ATTORNEYS

INVENTOR.
JACK R. OLSON
ATTORNEYS

ELECTROMAGNETIC FLOWMETER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

There are numerous requirements for measuring fluid flow through a conducting medium and these requirements have been successfully achieved where the conducting medium is restricted, such as a pipe. However, the flow of water in an unrestricted environment, such as the ocean, presents many variables which makes accurate velocity measurements much more difficult. This is particularly so in measuring the velocity of sea-water in shallow areas because of the presence of orbital velocities due to surface waves.

Numerous types of instruments have been devised to measure ocean currents using mechanical devices such as impellers; acoustic types using time difference of sound travel and doppler shift; and types employing electromagnetic principles. The instant invention is of a type which utilizes electromagnetic principles.

Electromagnetic meters make use of Faraday's law of induction which states that a potential difference is induced in a conductor moving in a magnetic field. In the present application, the sea-water is the conductor, and the potential difference is directly proportional to the velocity component of the sea-water that is flowing through the magnetic field normal to the lines of forces.

Electromagnetic flowmeters appear to be the most promising in that there are numerous advantages, namely, they have no moving parts, provide good linearity and fast response. However, existing electromagnetic flowmeters, as well as the other types, have one limitation in that the directional response to the sea-water flow does not sufficiently approximate a true cosine curve and, consequently, the flowmeter does not measure the desired velocity components accurately for every angular flow direction therethrough.

The primary cause for this deficiency is the inability of the prior art flowmeter designs, in both electromagnetic types and other types, to support the sensing elements, i.e., electrodes, in such a manner as to avoid physical interference or obstruction to the water flow to be measured. Use of solid bodies for supporting the electrodes create eddy currents or swirls that impair the measurements, while the use of tubular housings in addition to creating mechanical interference has a directional limitation in the accurate measurements of water flow that is angularly disposed to the longitudinal axes of the housing.

SUMMARY OF THE INVENTION

The electromagnetic flowmeter of the present invention utilizes an "open" cage-like housing for the magnetic field coils and electrodes that practically eliminates any physical interference to the water flow, the velocity of which is to be measured. In the preferred embodiment, a uniform magnetic field is produced by preferably two ring-shaped coils, each coil lying in a parallel plane, and rigidly connected together in uniform spaced planar relation by a plurality of peripherally spaced supports. At least one pair of spaced electrodes are rigidly supported by the cage in a plane parallel to and lying between the planes containing the coils. The resulting construction is one of an "open" frame or cage which does not present any significant physical interference to the water flow through the meter and thereby allows unrestricted flow of water to be measured accurately. The coils and electrodes are electrically connected in a suitable circuit to produce the magnetic field between the coils, and to measure the signal output of the electrodes. The dimensions of flowmeter are not critical and depend on the available power source, the number and size of coil turns, the dimensions and desired uniformity of the magnetic field, the sensitivity of the signal to be measured as well as other factors. The flowmeter can be supported on the ocean flow or suspended from a boat or the like.

STATEMENT OF THE OBJECTS OF THE INVENTION

A primary object of this invention is to provide a flowmeter that is capable of more accurately measuring fluid flow, and a corollary object is to provide such a flowmeter that can obtain such measurements both in a shallow water and a deep water environment.

Another important object is to provide a flowmeter that can record accurately a low-frequency flow (i.e., internal wave motion or tidal flow) in the presence of a high-amplitude, higher frequency flow (from surface waves).

Still another object is to provide a flowmeter that provides a good directional response approximating a cosine curve, without sacrificing the other advantages of electromagnetic flowmeters, such as linearity, fast response, and no moving parts.

Other objects, advantages and novel features of the invention will become apparent from the following detailed description of the invention when considered in conjunction with the accompanying drawings wherein.

Figure 1:
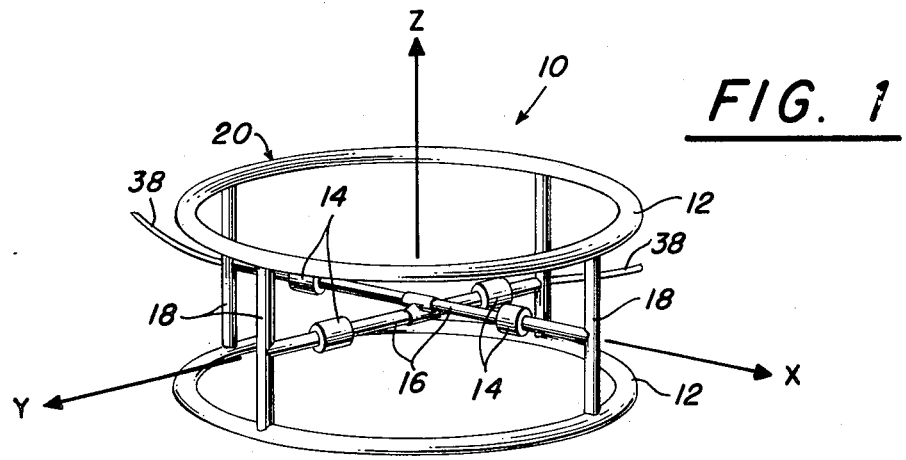
FIG. 1 is a perspective view of the flowmeter oriented with the coils and electrodes disposed in the horizontal plane, parallel to the X and Y axes, as shown in the associated coordinate diagram.
Figure 2:
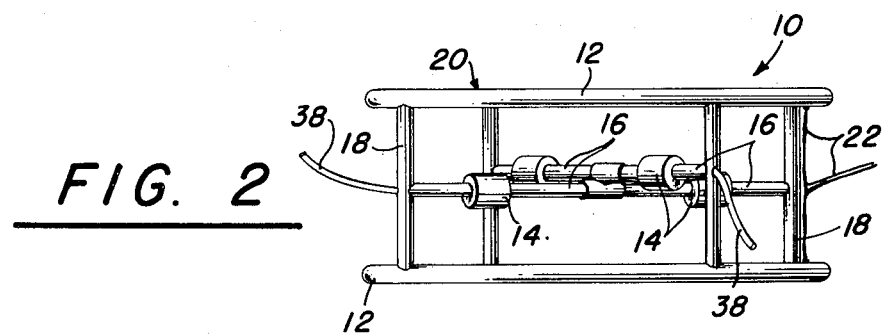
FIG. 2 is an end view of the flowmeter showing the two pairs of electrodes, one pair of electrodes being placed along the X axis and the other along the Y axis.

Referring to the drawing where like reference numerals refer to similar parts throughout the figures there is shown in FIGS. 1 and 2 an electromagnetic flowmeter 10 constructed according to the teachings of this invention, including one or more coils 12 for producing a magnetic field and one or more pairs of spaced electrodes 14. The electrodes are mounted on insulated supports 16 secured within the magnetic field and in the path of the potential gradiant induced in the seawater conductor moving through the field. Although one coil can be used it is preferably to employ at least two coils to provide a more uniform magnetic field. Coils 12 are disposed in parallel planes, shown parallel to a plane containing the X and Y axes, and rigidly secured together by a plurality of peripherally spaced transverse rods 18 made of micarta or the like to form an "open" cage-like frame 20. Frame 20 can be supported or suspended in any suitable manner, and the flowmeter oriented in any direction depending on the particular installation. The coils are series-connected and fed by cables 22 from a power amplifier circuit shown in FIG. 4, hereinafter described in detail, to produce the magnetic field through which flows the water to be measured.

As the flowmeter is designed to be immersed in seawater, being particularly suitable for use at shallow depths, the "open" cage-like construction is a very important feature of the invention as it minimizes the physical obstruction that would otherwise interfere with the normal water flow through the meter.

The dimensions and spacing of the coils and electrodes will vary with each application as they depend on many variables such as the available power source and its type; the strength of the output signal to be recorded which in turn depends on the water velocity; the number of coil turns, etc.

One particular flowmeter constructed and tested according to this invention had each coil formed of 140 turns of No. 23 "Formvar"-covered copper wire with a circular cross-sectional area of 0.71 cm$^2$. The wire was epoxied as it was wound on the form and the coils epoxied to rods 18 to produce a rigid and strong cage construction. The mean diameter of each coil was 25.5 cm, and the planes containing the coils are separated by a distance of 9.8 cm. The electrodes 14 of each pair are spaced apart 14.4 cm. The separation distance was determined experimentally as will be described with reference to FIG. 5, to obtain the most uniform magnetic field between the electrodes.

Figure 5:
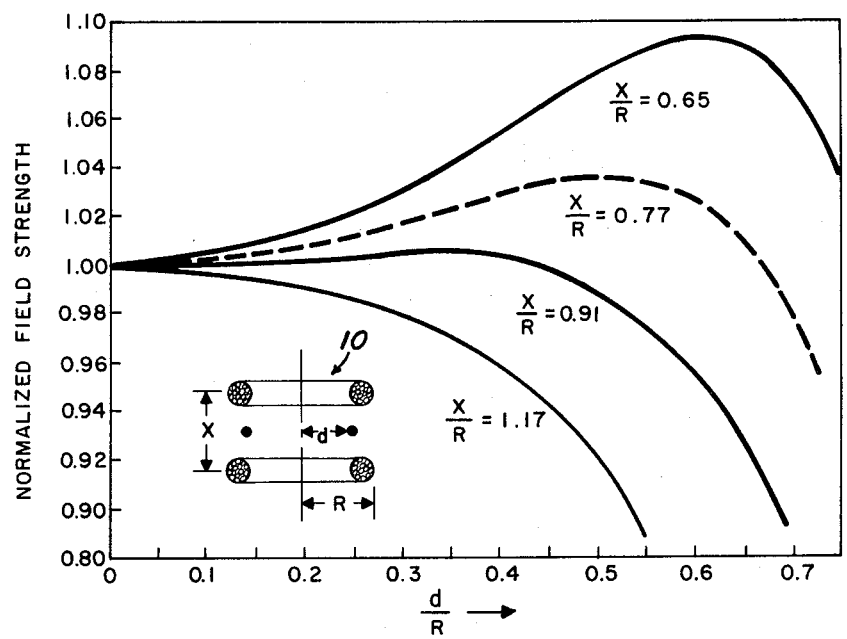
FIG. 5 is a chart showing the field strength for various ratios of separation distance between coils and coil radius.

FIG. 5 shows the normalized field strength plotted for various $X/R$ ratios, where $X$ is the separation distance between the coils, and $R$ is the coil radius. A value of $X/R = 0.77$ was selected for the coils dimensions, which gave deviations from a uniform field of $\pm 3$ percent over 70 percent of the coil diameter. A-C current of 17 cps is used to drive the coils. A coil current of 1.5 amp rms was a reasonable value from the standpoint of amp turns, available power, and coil heating. This produced a field strength of about 15-gauss rms. The resistance of the coils was 16.8 ohms and the normal coil power was 38 watts.

The internal impedance of this particular flowmeter (i.e., between the electrodes) in salt water at 17 cps was about 18 ohms. The ideal signal output in volts of the meter can be calculated from the formula:

$$e = uBd$$

where $u$ = flow velocity (meters/sec), $B$ = intensity of magnetic induction (webers/m$^2$), and $d$ = distance between electrodes (meters). For this particular flowmeter $B = 15 \times 10^{-4}$ webers/m$^2$ rms, and $d = 0.144$ meters. Therefore, $e = 216$ $\mu$ rms per meter/sec. (equivalent to a flow of about 2 kts).

As previously described, electrodes 14 are supported in cage 20 by insulator supports 16 which are suitably secured to oppositely disposed transverse rods 18. Referring to FIGS. 1 and 2, the electrodes and their supports can be disposed along either the X or Y axis, or in both axes, and in planes parallel to and between the planes containing coils 12 so as to be in the uniform magnetic field created between the coils. In the preferred embodiment both pairs of electrodes are employed, being laterally displaced along the Z axis, which enables the simultaneous recording of two components of the water velocity from which the resultant velocity in one plane can be calculated. However, it is obvious that the flowmeter can be operated with only one pair of electrodes in which situation only one component of the flow will be measured.

Figure 3:
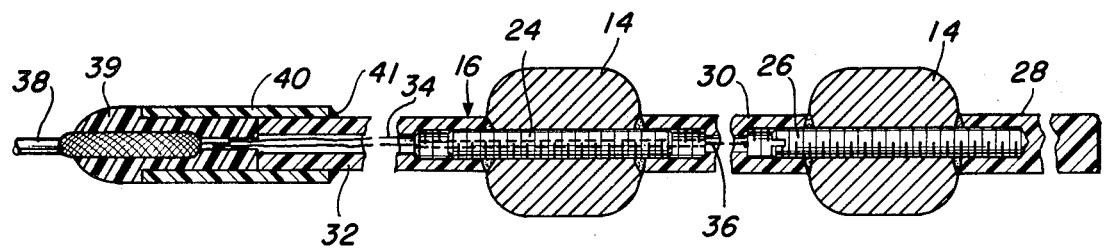
FIG. 3 is a longitudinal cross-section of one pair of electrodes.

The details of each electrode assembly are shown in FIG. 3. Electrodes 14 are preferably made of graphite to reduce electrochemical and thermoelectric effects, and are threaded on and epoxied to brass rods 24 and 26, which in turn are threaded into micarta sleeves 28, 30, and 32. Sleeves 30 and 32, as well as rod 24 are hollow to pass conductors 34 and 36 that are electrically connected by soldering to metal sleeves 24 and 26 of the respective electrodes. Conductors 34 and 36 are part of a shielded cable 38 electrically connected to its corresponding portion of the circuit of FIG. 4. Cable 38 is cemented by polyeurthane 39 or the like to an outer micarta sleeve 40 telescopically receiving micarta sleeve 32 and epoxied thereto at 41.

Figure 4:
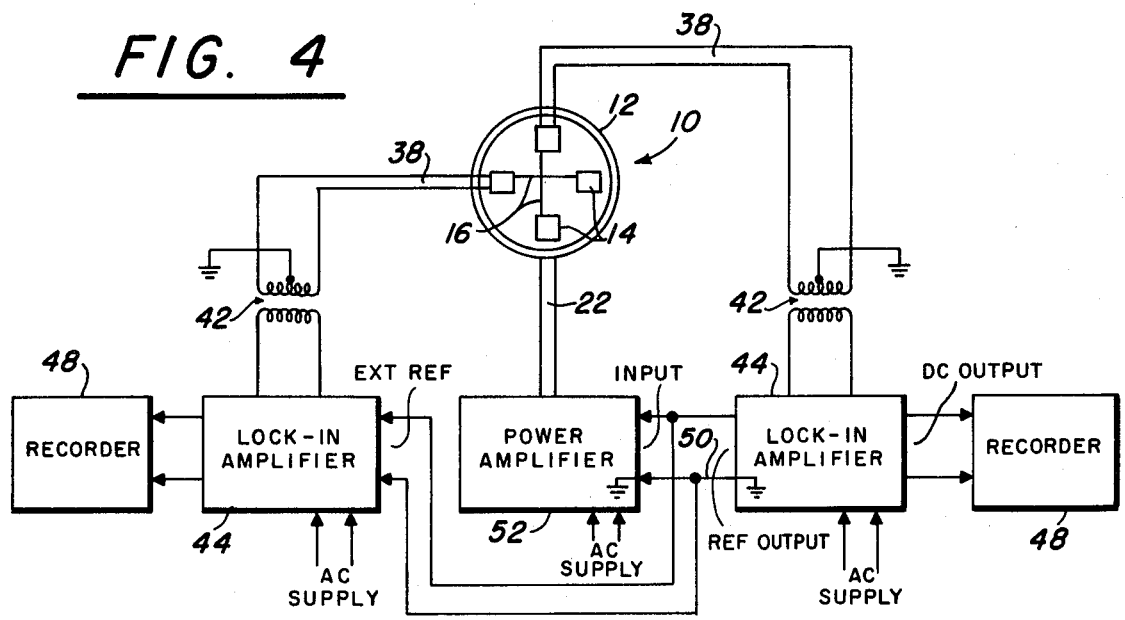
FIG. 4 is a circuit diagram of the flowmeter showing the power source for the magnetic coils and the measuring circuit from the electrodes including a strip chart recorder.

Coils 12 and each corresponding pair of electrodes 14 are electrically connected by cables 22 and 38, respectively, to a circuit shown in FIG. 4. An a-c or d-c magnetic field may be used for the coils, the disadvantage of a d-c field being electrode polarization. Although use of an a-c field creates a quadrature noise voltage due to electrode loops and capacitive coupling, the former being minimized by the use of coaxial or twisted leads, this noise is fortunately about 90° out of phase, and therefore the a-c field is preferred.

To create a balanced input with respect to ground, each pair of electrodes 14 is connected by cable 38 to a high-quality, shielded transformer 42 having a grounded center tap. The particular transformer utilized has a voltage step-up of approximately 12 to 1. The transformer output is fed to a lock-in amplifier 44 that is capable of accurate measurement of a small signal from the electrodes. This amplifier operates as a very narrow-band, phase-sensitive, frequency-selective detector capable of detecting a desired phase component of the signal. A d-c output from amplifier 44 drives a strip chart recorder 48. Each pair of electrodes is provided with its own transformer 42, lock-in amplifier 44, and strip chart recorder 48.

Lock-in amplifier 44 has a reference frequency output of 17 cps for driving a power amplifier 52, the output of which is connected to coils 12 via cable 22 to produce the magnetic field. Electrodes 14 pick up the desired signal from the velocity flow of water through the field, the quadrature voltage, and other noise (mainly 60 cps pick up). Since the reference frequency of 17 cps determines the center frequency of the pass band, the 60 cps noise is rejected. If the voltages at the reference frequency are in phase with the reference, the d-c output is maximum and has positive polarity. If the phase difference is 180°, the d-c output is maximum but of opposite polarity which occurs when the flow direction of the water is reversed. If the phase difference is 90°, the d-c output is zero. Therefore, lock-in amplifier 44 is capable of detecting a particular phase component with respect to the reference output by a phase control setting. As used with the flowmeter, amplifier 44 measures the desired signal from the electrodes while rejecting the quadrature noise. If the quadrature voltage is large compared with the signal, small errors in setting the phase control will produce zero shifts in the output. If this is the case, the quadrature voltage level reaching the lock-in amplifier would be reduced by inserting a proper bucking voltage.

Figure 6:
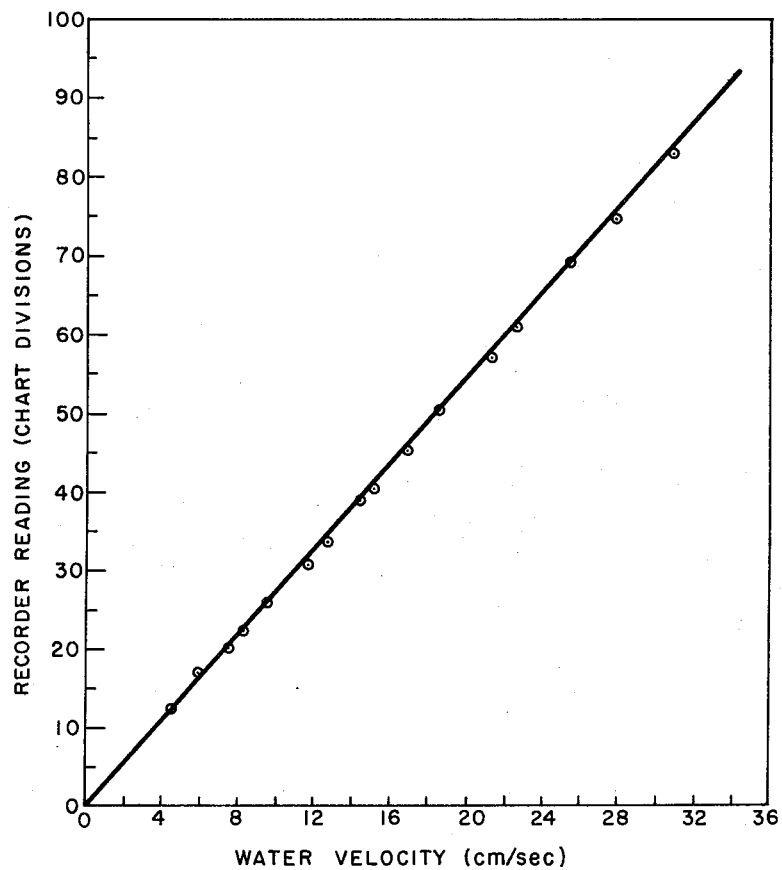
FIG. 6 is a chart showing the recorded readings of the output of the flowmeter for various water velocities through the flowmeter.

The linearity of the particular flowmeter tested is illustrated in FIG. 6 where the output of the flowmeter is compared to water velocity passing through the flowmeter. The full scale of the recorder reading (100 divisions) represents ±0.5 volts. For this measurement the flowmeter of FIGS. 1 and 2 was supported with the plane containing the x-y axes of the meter being horizontal, and the water flow direction was along the X-axis. As can be seen from FIG. 6 good linearity of the meter is evident.

Figure 7:
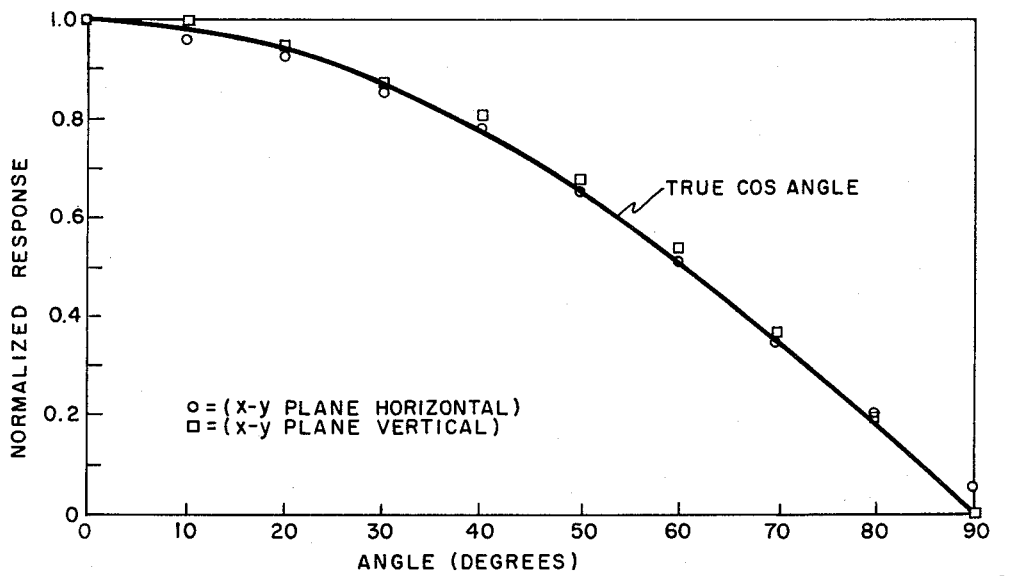
FIG. 7 is a chart showing the angular directional response of the flowmeter closely approximating a cosine function.

The directional response of the flowmeter (using only one pair of electrodes) was obtained by positioning the x-y axes of the flowmeter in both the horizontal plane and in the vertical plane, the plots of both positions being illustrated in FIG. 7. A true cosine curve is shown in solid line for purpose of comparison with both plots. With the flowmeter positioned so that its x-y plane was in the horizontal, the meter was rotated in 10° increments about its z-axis. Thereafter, with the flowmeter positioned vertically, that is, its x-y plane being in the vertical, the meter was checked around the y-axis. In each test position, the water flow was along the x-axis, the zero position being when the flow was perpendicular to the lines of force of the magnetic field between the coils and normal to a line containing the two electrodes used. A comparison of the two sets of plots with the true cosine curve shown in a solid line discloses less than 2.5 percent rms deviation, and thus the flowmeter closely approximates a true cosine response.

The flowmeter of this invention retains all of the advantages of prior art electromagnetic flowmeters, such as good linearity, fast response, and no moving parts. In addition, the present flowmeter through its "open" design permits a directional response which is nearly a true cosine. The flowmeter construction permits its orientation in a vertical plane on a horizontal plane, and to measure the corresponding velocity flow component. Its "open" design reduces to a minimum any physical obstruction to the normal flow of the water to be measured thereby enhancing the quality of the recorded water velocity. In addition, the flowmeter is capable of recording correctly a low-frequency flow in the presence of a high-amplitude, higher-frequency flow. The flowmeter is capable of being adapted in design to the particular installation and the available power.

Obviously many modifications and variations of the present invention are possible in the light of the above teachings. It is therefore to be understood that within the scope of the appended claims, the invention may be practiced otherwise than as specifically described.

What is claimed is:

1. An electromagnetic flowmeter for measuring the velocity of an electrically conductive fluid medium comprising air-core type coil means for creating a magnetic field, the coil means being open to permit the flow of the fluid medium therethrough;

means for connecting said coil means to a source of power;

electrode means suspended within said magnetic field for measuring the potential gradient in the fluid medium moving through the magnetic field;

means for connecting said electrode means to a measuring circuit;

said coil means and electrode means providing an "open" construction enabling unrestricted flow of said fluid medium through the flowmeter from any direction.

2. The flowmeter of claim 1 wherein:

said coil means comprises a pair of spaced coils;

a plurality of insulator rods transversely connecting said coils in spaced parallel arrangement;

said transverse insulator rods being peripherally spaced around said coils to form an "open" cage construction.

3. The flowmeter of claim 2 wherein said pair of coils are connected together in series.

4. The flowmeter of claim 2 wherein said electrode means comprises a pair of spaced electrodes mounted on an insulator support connected to and suspended between oppositely disposed transverse insulator rods.

5. The flowmeter of claim 4 wherein planes containing said coils and the plane containing the electrodes are all parallel to each other.

6. The flowmeter of claim 2 wherein said electrode means comprises two pairs of spaced electrodes, each pair of electrodes mounted on an insulator support connected to and suspended between oppositely disposed transverse insulator rods, said insulator supports being disposed at right angles to each other.

* * * * *